H. W. BARCK.
DISK ATTACHMENT FOR CULTIVATORS.
APPLICATION FILED MAR. 2, 1915.

1,233,015.

Patented July 10, 1917.

Witnesses
J. C. Simpson
D. T. Morris

Inventor
H. W. Barck
By
Attorneys

UNITED STATES PATENT OFFICE.

HENRY W. BARCK, OF LUVERNE, MINNESOTA.

DISK ATTACHMENT FOR CULTIVATORS.

1,233,015.  Specification of Letters Patent.  Patented July 10, 1917.

Application filed March 2, 1915. Serial No. 11,554.

*To all whom it may concern:*

Be it known that I, HENRY WILLIAM BARCK, a citizen of the United States, residing at Luverne, in the county of Rock, State of Minnesota, have invented certain new and useful Improvements in Disk Attachments for Cultivators; and I do hereby declare the following to be a full, clear, and exact description of the invention, such as will enable others skilled in the art to which it appertains to make and use the same.

This invention relates to a disk attachment for cultivators.

The object of the present invention is to improve the construction of disk attachments for cultivators.

In connection with the above it is also an object to provide a peculiarly formed cleaning device for cultivator disks which may be attached to the shank of the disk attachment hereinafter described.

With these and other objects in view, such as will appear as the description progresses, my invention comprises the combination and arrangement of parts as set forth in and falling within the scope of the appended claim.

Referring to the drawing.

Referring to the drawing wherein like parts are indicated by like characters throughout the several views.

Figure 1:
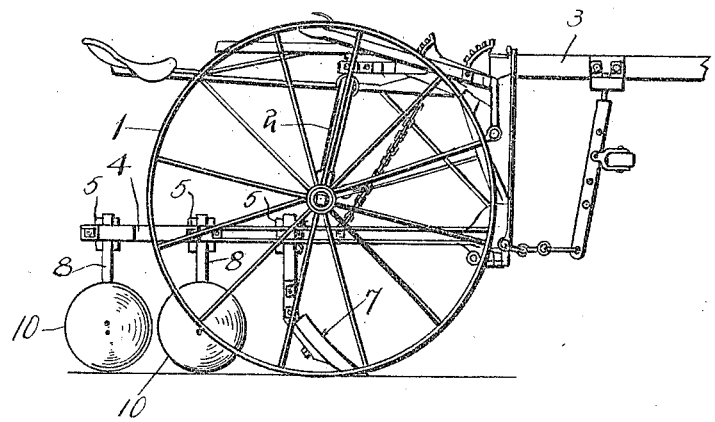
Figure 1 is a side elevation of a shovel plow showing two of the shovels replaced by two of the disks constructed in accordance with my invention, the remaining shovel being shown to illustrate the interchangeability of the shovels and disks.
Figure 2:
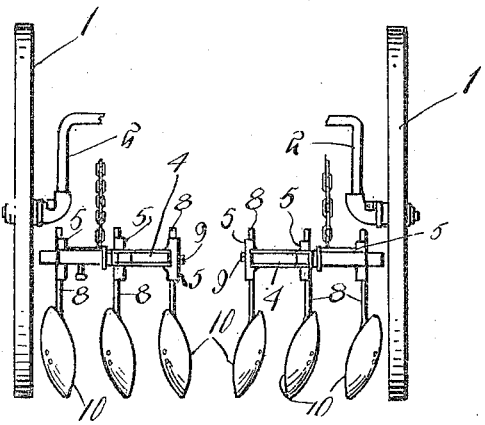
Fig. 2 is a rear elevation of the cultivator provided with the disks.
Figure 4:
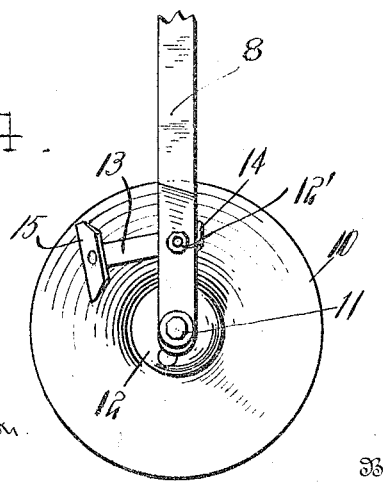
Fig. 4 is an enlarged detail of one of the disks.
Figure 3:
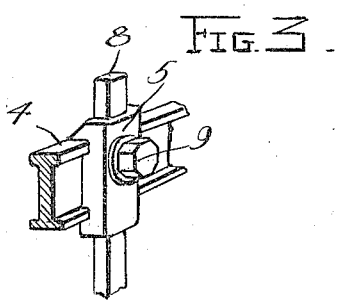
Fig. 3 is a detail showing the manner of mounting the disks.

The reference character 1 indicates the supporting wheels of a cultivator which are rotatably mounted on the usual axle 2 to which is secured the draft beam 3.

Suspending from this beam are shovel beams 4 which diverge rearwardly and which have a plurality of sockets 5 thereon. These sockets are of tubular formation and have holes in the sides thereof.

My invention contemplates the use of either shovel or disk cultivators in these sockets, the sockets being ordinarily used to support shovels such as indicated at 7 in Fig. 1.

The disk cultivator, which I contemplate mounting in place of these shovels, comprises a shank portion 8 which is constructed to be inserted in the sockets 5 and maintained therein by a set screw 9.

This shank 8 is bent between its ends so as to throw the forward edge of the disk 10 outwardly and incline the said disk from the vertical. This disk 10 is rotatably mounted on the lower end of the shank by a bolt 11 which passes through a bearing portion 12 of the said disk, which bearing portion extends outwardly from the face of the disk. This disk is of concavo-convex formation.

Secured to the lower portion of the shank 8 by a bolt 12' is an outwardly extending arm 13 which has a lip 14 on the end thereof arranged to engage the edge of the shank so as to prevent movement of the said arm. On the other end of the arm, however, is a scraper member 15, the cutting edge of which bears upon the concaved surface of the disk. Thus when the disk is rotated during the operation of the machine, the dirt which collects on the inner face of the disk is removed during the rotation of the said disk by the scraper 15.

It will be thus seen that it will be necessary to have but one frame on which the shovels or disk cultivators may be detached and interchangeably mounted.

It will be further seen that by providing this construction the necessity for using separate and distinct disk beams will be obviated, as the shovel beams may be used for either the disks or shovels.

It may be thus seen that I have provided a construction whereby the shovels of a shovel plow may be removed and interchanged with cultivator disks.

While I have illustrated and described a particular embodiment of my invention, I wish it to be understood that I do not wish to be limited to that particular embodiment as it is obvious that numerous changes may be made within the details of construction thereof without in any way departing from the spirit of the invention or exceeding the scope of the appended claim.

What is claimed is:—

In a disk attachment for cultivators, the combination with a shank having its lower end angularly bent into an offset, a disk mounted upon the extremity of the offset end and having its concaved side facing the latter, a scraper arm mounted upon the shank above the axis of the disk and a scraper on the free end of the scraper arm contacting with the concavity of the disk, said scraper arm being attached to the shank at an intermediate point, and having its rear end overturned to lie against the rear edge of the shank so as to provide a lock stop to prevent relative movement of the arm and the shank.

In testimony whereof, I affix my signature, in the presence of two witnesses.

HENRY W. BARCK.

Witnesses:
W. E. GRUVER,
M. O. PAGE.

Copies of this patent may be obtained for five cents each, by addressing the "Commissioner of Patents. Washington, D. C."